(12) United States Patent
Ting

(10) Patent No.: US 7,416,427 B2
(45) Date of Patent: Aug. 26, 2008

(54) CARD CONNECTOR

(75) Inventor: Chien-Jen Ting, Tu-Cheng (TW)

(73) Assignee: Hon Hai Precision Inc. Co., Ltd., Taipei Hsien (TW)

( * ) Notice: Subject to any disclaimer, the term of this patent is extended or adjusted under 35 U.S.C. 154(b) by 0 days.

(21) Appl. No.: 11/786,120

(22) Filed: Apr. 10, 2007

(65) Prior Publication Data

US 2007/0238339 A1   Oct. 11, 2007

(30) Foreign Application Priority Data

Apr. 10, 2006  (TW) ............................... 95112602 A

(51) Int. Cl.
*H01R 13/62* (2006.01)
(52) U.S. Cl. ...................................... 439/159
(58) Field of Classification Search ................. 439/159, 439/160, 325, 327; 361/726
See application file for complete search history.

(56) References Cited

U.S. PATENT DOCUMENTS

| | | | |
|---|---|---|---|
| 5,286,207 A * | 2/1994 | McHugh ....................... | 439/64 |
| 5,389,001 A * | 2/1995 | Broschard et al. ........... | 439/159 |
| 6,776,632 B2 | 8/2004 | Kikuchi et al. | |
| 6,981,885 B2 * | 1/2006 | Oh .............................. | 439/159 |
| 7,172,430 B2 * | 2/2007 | Kojima ......................... | 439/64 |

* cited by examiner

*Primary Examiner*—Alexander Gilman
(74) *Attorney, Agent, or Firm*—Wei Te Chung

(57) ABSTRACT

A card connector in accordance with the present invention comprises an insulating housing defining a card receiving space, a plurality of contacts retained in the insulating housing and exposed into the card receiving space, an ejector disposed in the insulating housing and a locking member. The ejector comprises a movable slider, a spring and a holding equipment to securely hold the slider in a final position and to release the slider from the final position when ejecting the card. The locking member has a retaining portion immovably fixed relative to the insulating housing and a latching portion locking the card.

11 Claims, 7 Drawing Sheets

CARD CONNECTOR

BACKGROUND OF THE INVENTION

1. Field of the Invention

The present invention is generally related to a card connector, and especially to a card connector which is used for consuming products such as digital cameras or the like.

2. Description of Related Art

Usually, consuming conducts, such as digital cameras, PDA (Personal Digital Assistance) and the like, need electrical cards to enlarge and enhance functions thereof. Therefore, card connectors adapted for receiving the corresponding cards is designed to accomplish requirements between the consuming products and the electrical cards. Commonly, a card connector often has an ejector to eject the corresponding card out therefrom and a locking arm to hold the card on a normal working state.

U.S. Pat. No. 6,776,632 discloses a card connector comprising an insulating housing defining a card receiving space and an ejector for ejecting a card received therein. The ejector has a slider with an ejecting bar for ejecting the card, a coil spring and a locking member fixed to the slider. The locking member moves along with the slider in a card insertion/ejection direction and moveably protrudes into a notch formed on the card to hold the card in a final position where the card is electrically connected with the card connector. However, the locking member is formed by a metal haulm bent several times to get a certain shape, and each corner of the locking member must be accurate for being able to engage with the card and the slider, so the locking member increases the manufacturing and assembly cost. Otherwise, the slider need to provide a gap adjacent to the ejecting bar for retaining the locking member, the gap reduces the intensity of joint where the ejecting bar links with the slider and may cause the ejecting bar to break off after repetitious use.

Hence, an improved card connector is highly desired to overcome the aforementioned disadvantages of the prior art.

SUMMARY OF THE INVENTION

Accordingly, an object of the present invention is to provide a card connector, which has a locking member for locking the card completely inserted into the card connector.

To achieve the above object, a card connector in accordance with the present invention comprises an insulating housing defining a card receiving space and a card insertion/ejection direction, a plurality of contacts retained in the insulating housing and exposed into the card receiving space, an ejector disposed in the insulating housing and a locking member. The ejector comprises a slider moving along the card insertion/ejection direction with the card inserted/ejected, a spring and a holding equipment to securely hold the slider in a final position where the card is electrically connected with the contacts and to release the slider from the final position when ejecting the card. The locking member has a retaining portion immovably fixed relative to the insulating housing and a latching portion locking the card in the final position.

Other objects, advantages and novel features of the present invention will be drawn from the following detailed description of a preferred embodiment of the present invention with attached drawings:

DETAILED DESCRIPTION OF THE INVENTION

Reference will now be made in detail to the preferred embodiment of the present invention.

Figure 1:
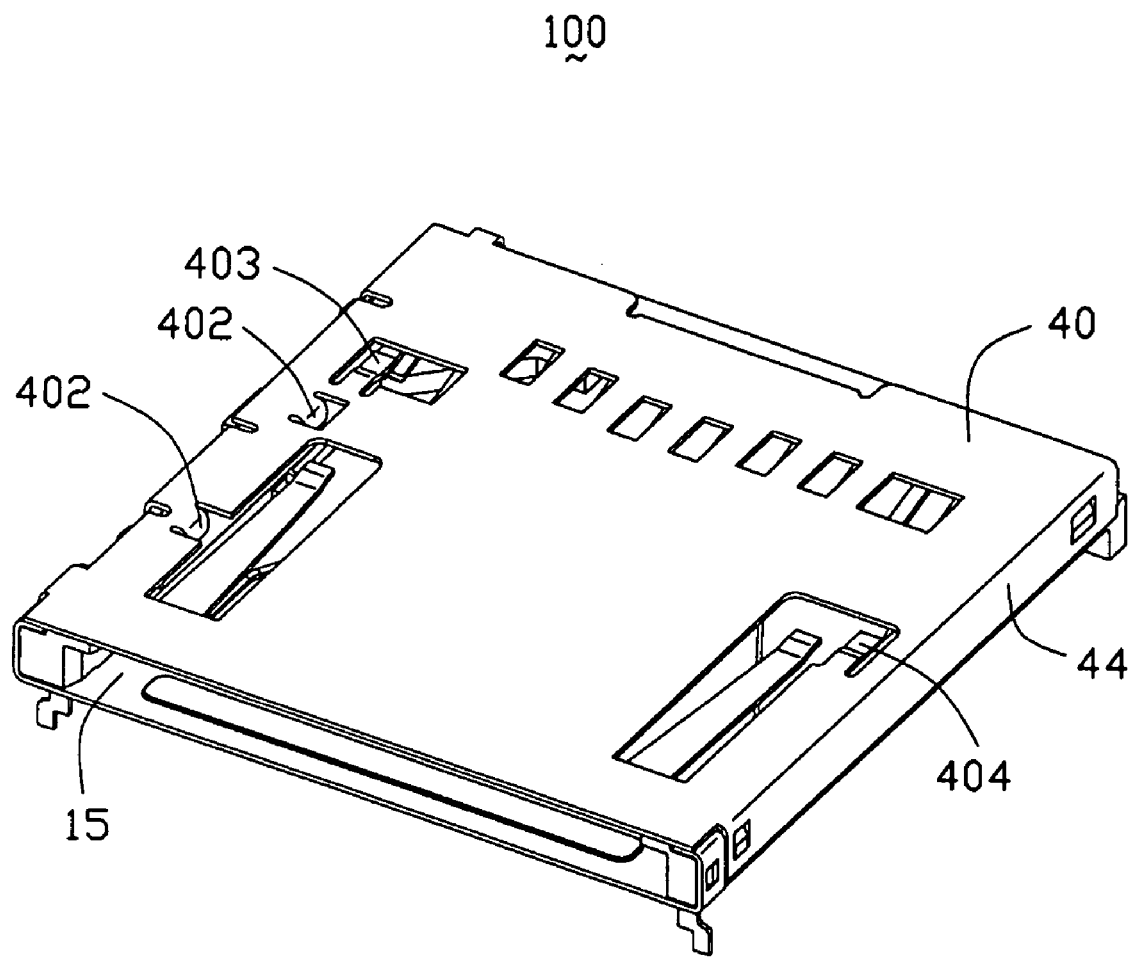
FIG. 1 is an assembled, perspective view of a card connector in accordance with the present invention.
Figure 2:
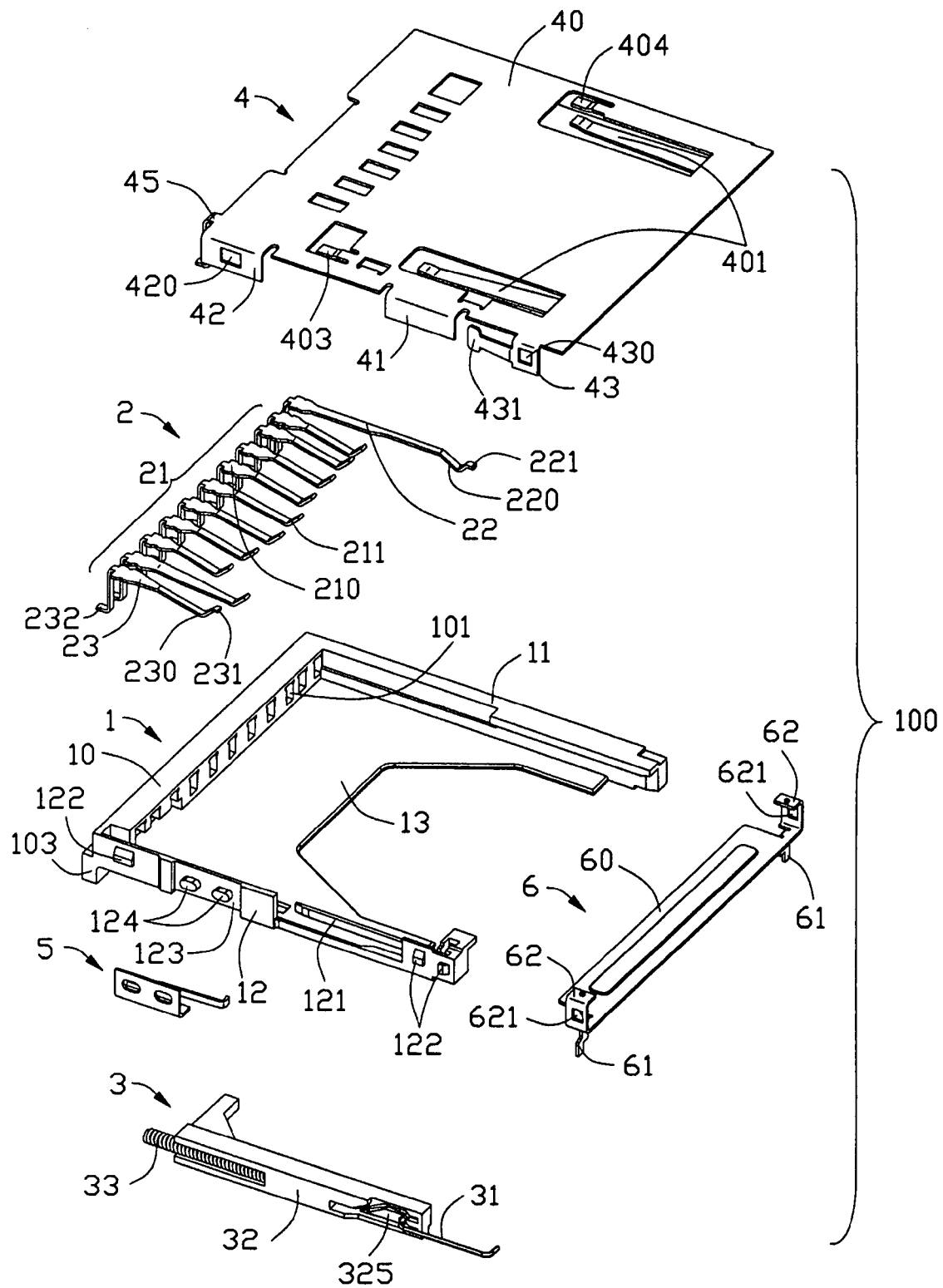
FIG. 2 is an exploded, perspective view of the card connector shown in FIG. 1.

Referring to FIGS. 1 to 2, the card connector 100 in accordance with the present invention is used to connect a card 7 to a print circuit board (not shown). The card connector 100 comprises an insulating housing 1, a plurality of contacts 2 received in the insulating housing 1, an ejector 3, a shell 4 covering the insulating housing 1, a locking member 5 and a supporting board 6.

Referring to FIGS. 1-4, the insulating housing 10 is approximately frame configuration. The insulating housing 1 comprises a front wall 10, a pair of opposite right and left sidewalls 11, 12 and a bottom wall 13, which commonly define a card receiving space 15 for accommodating the card 7 and a card insertion/ejecting direction. The front wall 10 has a step 103 for supporting the insulating housing 1. The opposite side walls 11, 12 are respectively formed with protruding blocks 112, 122 on outsides surface thereof for mating with the shell 4. The left sidewall 12 is formed with a recess 123 on an outside surface thereof with two pins 124 in the recess 123, a gap 120 in a rear end thereof and a pole 102 in a front end thereof. The bottom wall 13 is formed with a rib 121 adjacent and parallel to the sidewall 12 to define a slot (not labeled) for receiving the ejector 3 and a through hole 130 for receiving the locking member 5. The through hole 130 is in front of the slot on the bottom wall 13 in a linear direction and corresponding to the recess 123 of the sidewall 12.

Figure 3:
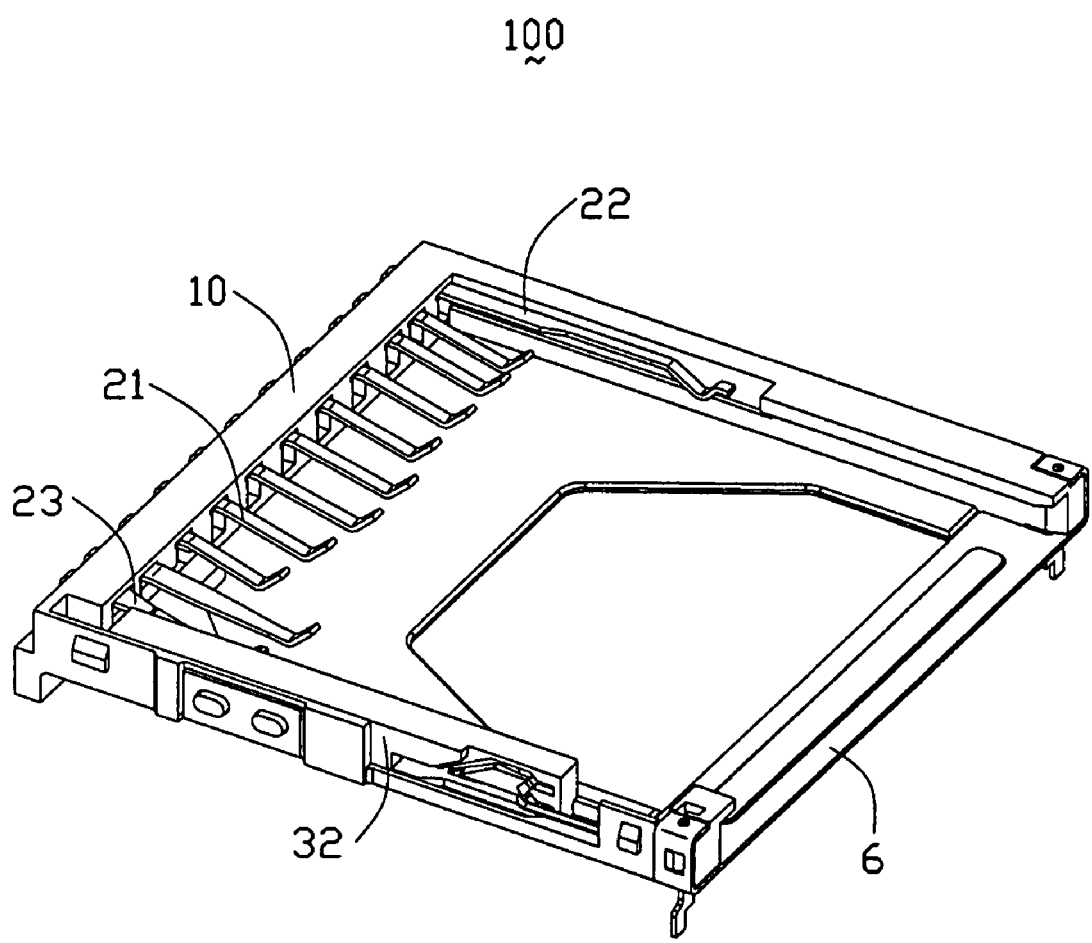
FIG. 3 is a partially exploded, perspective view of the card connector in accordance with the present invention.
Figure 4:
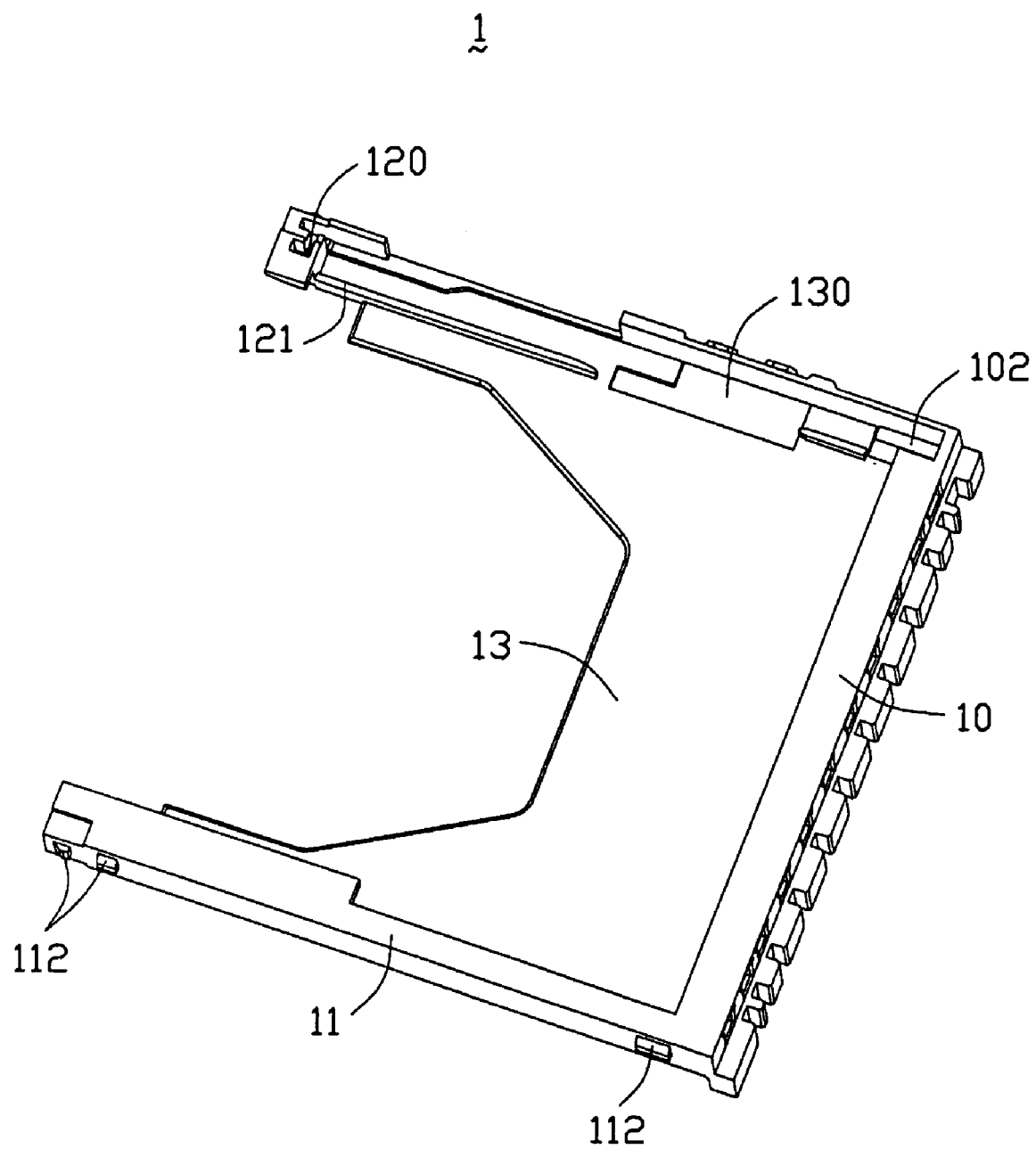
FIG. 4 is a perspective view of an insulating housing of the card connector in accordance with the present invention.
Figure 5:
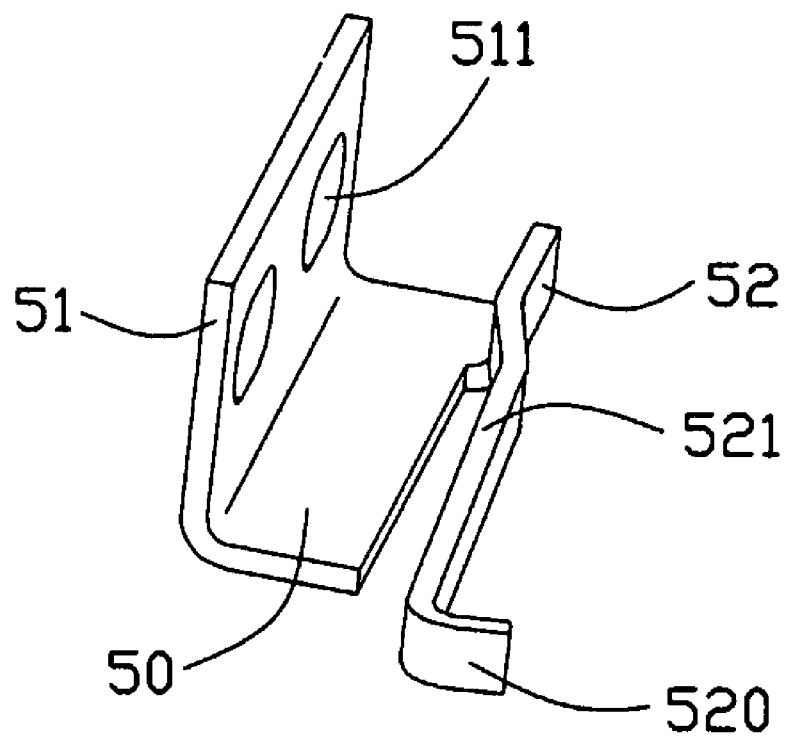
FIG. 5 is a perspective view of a locking member of the card connector in accordance with the present invention.
Figure 6:
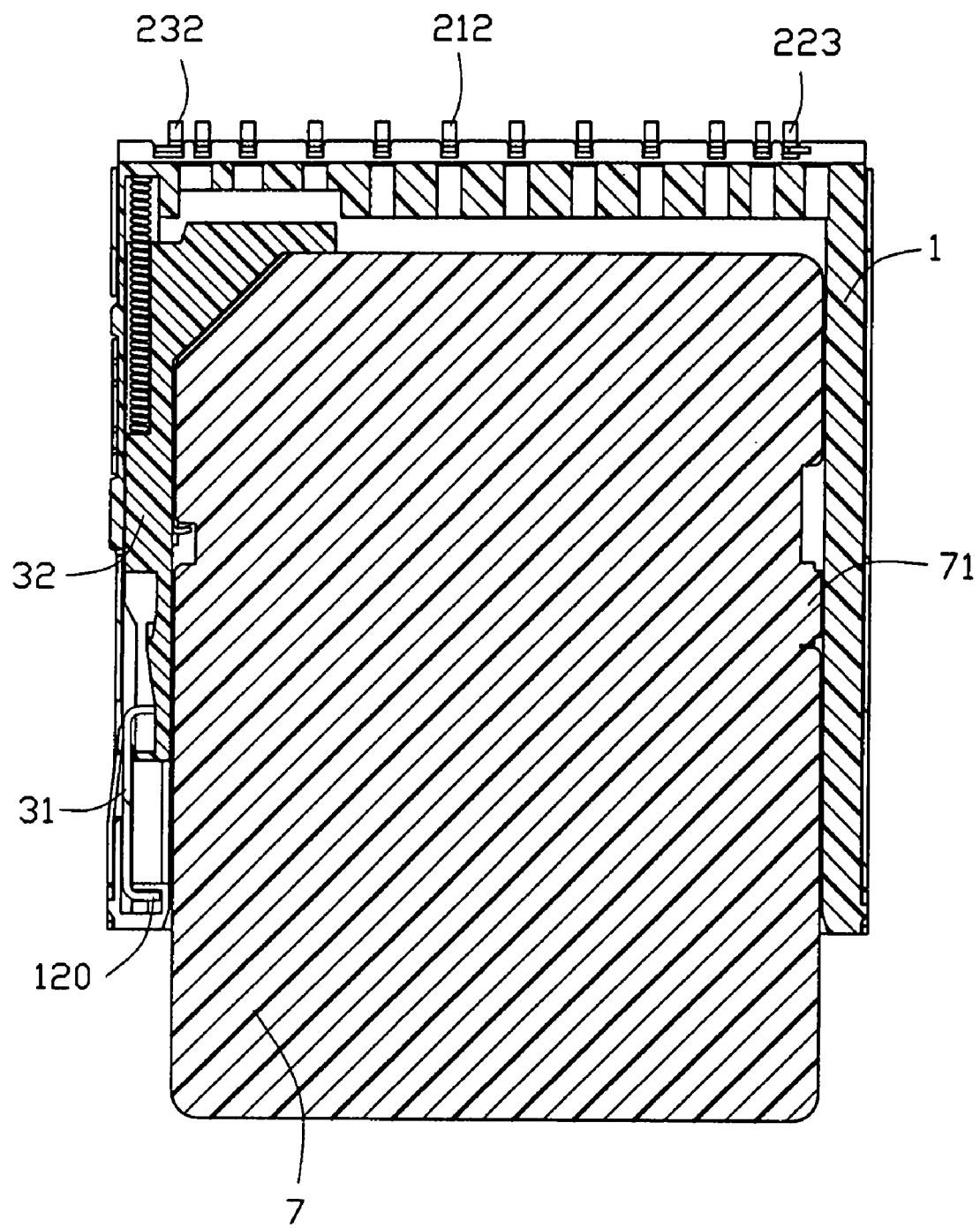
FIG. 6 is a cutaway view of the card connector with a card, wherein the locking member engages the card.
Figure 7:
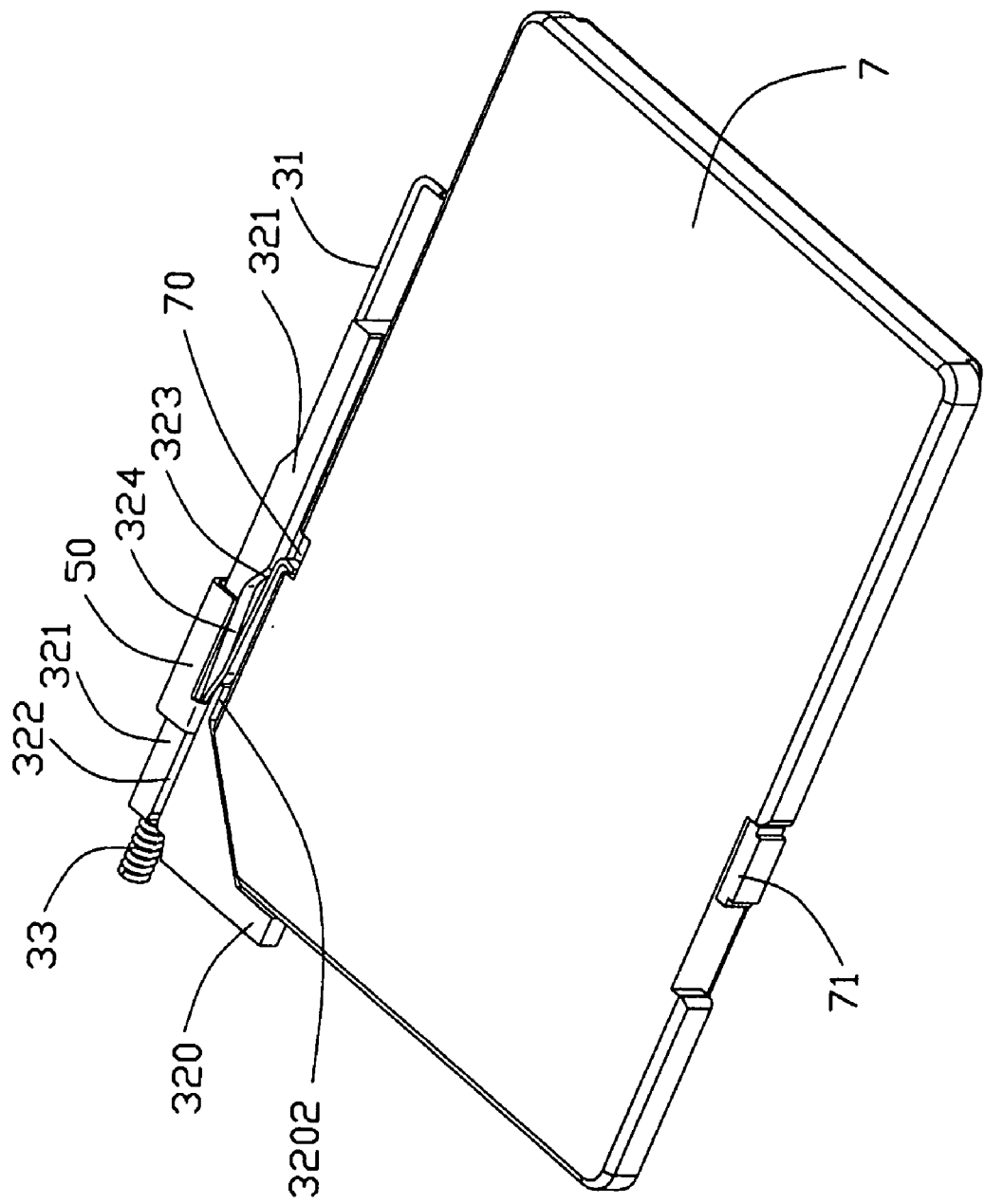
FIG. 7 is a perspective view of the locking member and the ejector with the card.

The contacts 2 include a plurality of contacts 21 for electrically connecting with the card 7, a write-protect contact 22 and a detecting contact 23. Each of the contacts 21 comprises a holding portion 210 retained to the insulating housing 1, a contacting portion 211 rearwardly extending from the holding portion 210 for contacting with the card 7 and a soldering portion 212 downwardly extending from the holding portion 210 to be soldered to the print circuit board. The write-protect contact 22 has a retaining portion (not shown), a spring portion 220, a mounting portion 223 and a contacting portion 221. The detecting contact 23 essentially has a same shape as the write-protect contact 22 and comprises a retaining porting (not shown), a spring portion 230, a mounting portion 232 and a contacting portion 231, FIG. 3 shows a situation that the contacts 2 are assembled to the insulating housing 1.

Referring to FIGS. 1-2, the shell 4 is stamped from a metal sheet and covers on the insulating housing 1. The shell 4 comprises a top wall 40, a plurality of side pieces 41, 42, 43, 44 extending downwardly from lateral sides of the top wall 40 and a soldering piece 45 extending downwardly from a left part of a front edge of the top wall 40 to a grounding track of the print circuit board (not shown). The side pieces 41, 42, 43 are in the left side of the shell 4, the side piece 44 is in the right, and the side pieces 42, 43 define latching hole 420, 430, the side piece 43 further has a pressing arm 431 for pressing the ejector 3. The top wall 40 is provided with a pair of pressing fingers 401 for downwardly pressing the card 7 inserted into the card connector 100 to get a well connecting between the card 7 and the contacts 21, two guiding pieces 402 on a left edge thereof for guiding the ejector 3, two elastic slices 403, 404 disposed respectively correspondingly to the write-protect contact 22 and the detecting contact 23. When the shell 4 assembles to the insulating housing 1, the latching holes 420, 430 of the shell 4 receive the protruding blocks 112, 122 of the insulating housing 1 to retain the shell 4 on the insulating housing 1.

Referring to FIG. 2 and FIGS. 5-7, the ejector 3 is disposed into the slot (not labeled) of the insulating housing 1 and used for ejecting the card 7 out of the card connector 100. The ejector 3 comprises a pin member 31, a slider 32 movable along the card insertion/ejecting direction and a spring 33. The slider 32 is formed with a heart groove 325 on an outside surface thereof, the pin member 31 has two ends, one end retained to the gap 120 of the insulating housing 1 and the other end moveable along the heart groove 325. One end of the spring 23 surrounds the pole 102 of the insulating housing 1 and the other end is partially received in the slider 32, by this way, the spring 33 is positioned between the insulating housing 1 and the slider 32. The pin member 31 and the heart groove 325 are referred as a holding equipment and can hold the slider 32 in a final position where the card 7 is electrically connected with the card connector 100 and can release the slider 32 when ejecting the card 7 by pushing the card 7 forwardly again.

The slider 32 is approximate in an L-shape and has a base 321 with the heart groove 325 and an ejecting portion 320 extending from a front end of the base 321 into the card receiving space 15 for ejecting the card 7, the base 321 defines a groove 322 extending along the card insertion/ejecting direction and a room 324 recessed from an inner side surface of the base 321 and communicating with the groove 322 on a bottom surface thereof. The room 324 has an incline 323 on a rear portion thereof and approaching to the inner side surface of the base 321. The slider 32 further has a restrictive wall 3202 to limit the locking member 5.

The locking member 5 has a horizontal body 50, a vertical retaining portion 51 formed with two holes 511 and upwardly bent from a left side of the body 50 and an upright portion 52 upwardly bent from a right side of the body 50 and being opposed to the retaining portion 51. The upright portion 52 comprises an elastic arm 521 extending along the card ejecting direction and a latching portion 520 inwardly bent from a free end of the elastic arm 521 toward the card receiving space 15. When the locking member 5 is assembled to the insulating housing 1 from a bottom-to-top direction, the body 50 is received in the through hole 130 on the bottom wall 13, the retaining portion 51 is placed in the recess 123 of the sidewall 12 and retained to the insulating housing 1 by the holes 511 receiving and jointed with the pins 124 of the sidewall 12 in a holt-melt process, the latching portion 520 of the upright portion 52 extends into the card receiving space 15 if the ejector 3 is not assembled to the insulating housing 1. After the ejector 3 is assembled in the insulating housing 1 and at an original position, the upright portion 52 of the locking member 5 is positioned in the groove 322 and the room 324 defined on the bottom surface of the slider 32, the elastic arm 521 is limited by the restrictive wall 3202 with the latching portion 520 positioning in the room 324 near the incline 323.

When the slider 32 moves forwardly along the card insertion direction together with the card 7, the elastic arm 521 will moves rearwardly along the groove 322 relative to the slider 32, the restrictive wall 3202 of the slider 32 will release the limit to the elastic arm 521 in this process. And then the elastic arm 521 rotates inwardly and the latching portion 520 will leave the room 324 and insert into a notch 70 defined on a side of the card 7. Following the slider 32 sequentially moving, the latching portion 520 further slides along the inner side surface of the slider 32 till the slider 32 arrives and is locked in the final position where the card 7 is completely inserted by the holding equipment. So, the latching portion 520 locks the card 7 to the insulating housing 1 and prevents the card 7 from pulling out of the card connector 100 by mistake for the inner side surface of the slider 32 limits the latching portion 520 to move outwardly. When ejecting the card 7, the slider 32 is released and moves rearwardly along the card ejecting direction, the latching portion 520 will return into the room 324 of the slider 32, and then the locking of the card 7 is released. The locking member 5 on present invention is in a simple shape and easily retains to the insulating housing 1, furthermore, the locking member 5 is able to keep the card 7 in the final position. And since the locking member 5 is not retained to the slider 32, so a configuration of the slider 32 is also predigested.

The card connector 100 further has the supporting board 6 assembled to an insertion port (not labeled) of the card connector 100 to support the card 7. The supporting board 6 has a main body 60, two legs 61 extending from opposed ends of the main body 61 and two mounting portions 62, each mounting portion 62 has an aperture 621 for engaging with the protruding blocks 112, 122 of the insulating housing 1.

The shell 4 assembles to the insulating housing 1 and covers the supporting board 6, the guiding pieces 402 guide the movement of the slider 32 of the ejector 3. The detecting contacts 23 together with the elastic slice 403 forms a detecting switch, the write-protect contact 22 together with the elastic slice 404 forms a write-protect switch engaging with a write-protect equipment 71 of the card 7.

While a preferred embodiment in accordance with the present invention has been shown and described, equivalent modifications and changes known to persons skilled in the art according to the spirit of the present invention are considered within the scope of the present invention as described in the appended claims.

What is claimed is:

1. A card connector comprising:
an insulating housing defining a card receiving space and a card insertion/ejection direction;
a plurality of contacts retained in the insulating housing and exposed into the card receiving space;
an ejector disposed in the insulating housing comprising a slider moving along the card insertion/ejection direction with the card inserted/ejected, a spring and a holding equipment to securely hold the slider in a final position where the card is electrically connected with the contacts and to release the slider from the final position when ejecting the card; and
a locking member having a retaining portion immovably fixed relative to the insulating housing, a latching portion locking the card, and an elastic arm connecting the retaining portion and the latching portion; wherein the slider defines a restrictive wall pressing the elastic arm to limit the locking member locking the card.

2. The card connector as described in claim 1, wherein the locking member moves relative to the slider and the card, following a movement of the slider along the card insertion direction together with the card, and the latching portion moves inwardly to enter into a notch formed on a side of the card.

3. The card connector as described in claim 2, wherein the latching portion limited by the slider to be kept in the notch of the card at the final position.

4. The card connector as described in claim 3, wherein the locking member has a horizontal body, a vertical retaining portion bent from the body and a upright wall opposed to the retaining portion, the elastic arm extending from the upright wall along the card insertion/ejecting direction with the latching portion in the free end thereof.

5. The card connector as described in claim 4, wherein the retaining portion of the locking member defines two holes, a sidewall of the insulating housing adjacent to the ejector is formed with a recess with two pins, when the locking member retains to the insulating housing by a hot-melt process, the retaining portion is received in the recess and the pins pass through and joins with the holes.

6. The card connector as described in claim 4, wherein the insulation housing has a front wall retaining the contacts, two opposed sidewall and a bottom wall defining a through hole near one of the sidewalls adjacent to the ejector for receiving the horizontal body of the locking member.

7. The card connector as described in claim 4, further comprises a supporting board assembled to the card connector to support the card.

8. An electrical connector comprising:
   an insulating housing defining a card receiving space and a card insertion/ejection direction;
   a plurality of contacts retained in the insulating housing and exposed into the card receiving space;
   an ejector associated with the insulating housing, comprising a slider moving along the card insertion/ejection direction with the card inserted/ejected, a spring and a holding equipment to securely hole the slider in a final position where the card is electrically connected with the contacts and to release the slider from the final position when ejecting the card; and
   a locking member essentially immovably fixed relative to the insulating housing along the card insertion/ejection direction, and including a latching portion laterally moveable with regard to the housing for locking the card, a latching portion locking the card, and an elastic arm connecting the retaining portion and the latching portion; wherein the slider defines a groove, and the elastic arm is received in the groove allowing the latching portion to lock the card.

9. The electrical card connector as claimed in claim 8, wherein said latching portion laterally invades the card receiving space in a relaxed state.

10. The electrical card connector as claimed in claim 8, wherein said latching portion is forcibly expelled from the card receiving space by said slider.

11. A card connector comprising:
   an insulating housing defining a card receiving space and a card insertion/ejection direction;
   a plurality of contacts retained in the insulating housing and exposed into the card receiving space:
   an ejector disposed in the insulating housing comprising a slider moving along the card insertion/ejection direction with the card inserted/ejected, a spring and a holding equipment to securely hold the slider in a final position where the card is electrically connected with the contacts and to release the slider from the final position when ejecting the card; and
   a locking member having a retaining portion immovably fixed relative to the insulating housing, an upright wall having an elastic arm extending along the card insertion/ejecting direction in the free end thereof, and a latching portion limited by the slider to be kept in a notch on a side of the card to lock the card;
   wherein the slider defines a groove and a room communicating with the groove for receiving the elastic arm and the latching portion of die locking member and allowing the slider to move without an obstructing from the locking member.

* * * * *